United States Patent Office 3,208,901
Patented Sept. 28, 1965

3,208,901
DIALLYL PHTHALATE OVERLAYS
William A. Kelley, Annapolis, and Arthur V. Dupuis, Baltimore, Md., assignors to FMC Corporation, New York, N.Y., a corporation of Delaware
No Drawing. Filed Apr. 6, 1962, Ser. No. 185,517
4 Claims. (Cl. 161—151)

This invention relates to diallyl phthalate resin laminates, and more particularly, to diallyl phthalate-impregnated overlay sheets.

Generally, diallyl phthalate resin decorative laminates are of three basic types: those in which the decorative layer is a resin-impregnated, printed decorative paper, a natural wood veneer or a printed ground coat. In each case, it is desirable to use one or more resin-impregnated fibrous overlay sheets to increase the resin film thickness at the surface of the laminate, thereby providing protection for the decorative surface. These laminates are prepared by first impregnating a fibrous carrier sheet with a diallyl phthalate resin solution, drying the impregnated sheet to a tack-free state, and then laminating the impregnated overlay sheet to the decorative layer. Heretofore, these fibrous carrier sheets have been made primarily from alpha-cellulose, or viscose rayon. However, laminates prepared with overlays containing these conventional carrier sheets are not completely satisfactory, primarily because the decorative design appears hazy through the overlay sheet, fibers from the carrier sheet can be seen at the surface of the laminate, and the resin surface is affected by boiling water.

It is an object of this invention to provide improved diallyl phthalate resin-impregnated overlay sheets.

Another object is to provide decorative laminates containing diallyl phthalate resin-impregnated overlays which have improved clarity, diminished surface fiber-show, and improved water resistance.

These and other objects will become apparent from the following description of this invention.

We have now found that decorative laminate overlays having excellent clarity, diminished surface fiber-show, and improved water resistance are provided by a diallyl phthalate resin-impregnated overlay sheet which comprises an unpigmented, fibrous carrier sheet containing a major portion of polymeric fibers wherein at least about 80% by weight of the polymer forming units are acrylonitrile, impregnated with about 70–90% of diallyl phthalate by weight of the impregnated sheet, about 85–100% of said diallyl phthalate being partial polymer and the remaining about 0–15% being monomer, and a catalytic amount of an organic peroxide, said overlay sheet having a residual volatile content of less than about 8% by weight, measured as material volatile after heating said sheet for 8 min. at 320° F. Surprisingly, diallyl phthalate resin-impregnated overlay sheets in which the fibrous carrier sheet contains a major portion of polymeric fibers wherein at least about 80% of the polymer forming units are acrylonitrile have greatly improved clarity, diminished surface fiber-show, and improved water resistance as compared with conventional diallyl phthalate resin-impregnated overlay sheets.

The improvement in appearance of laminates prepared from the overlay sheets of this invention is quite remarkable. Prior art laminates prepared from alpha-cellulose or rayon overlay sheets have a significant haziness in appearance, visible fiber-show at the resin surface, and poor water resistance. Although the reason for the improvement of this invention is not completely understood, it is believed to be due to the unusual optical compatibility between resin and fiber, and to the thermoplastic nature of the fibers. Apparently, when the fibrous carrier sheet contains a major portion of polymeric fibers wherein at least about 80% of the polymer forming units are acrylonitrile, the fibers at the surface of the overlay tend to deform and flatten during lamination so that there is a continuous film of resin at the surface of the laminate. When carrier sheets containing a major portion of acrylic fibers in which less than 80% of the polymer forming units are acrylonitrile, one or more of the improved properties of this invention will not be realized, and the overlay will have inferior solvent resistance and in most cases undesirable yellowing properties.

The fibrous carrier sheets which are suitable for preparing the improved overlays of this invention may be either paper or non-woven fabric containing a major portion of polymeric fibers wherein at least about 80% and preferably at least about 90% of the polymer forming units are acrylonitrile. In some cases, it may be desirable to use a minor amount, up to about 45%, of fibers other than those derived from acrylonitrile, for example alpha-cellulose, rayon, or cotton, to facilitate handling of the carrier sheet on paper-making equipment. Such amounts of non-acrylonitrile fibers result in a slight, but commercially acceptable, reduction in the benefits associated with the polyacrylonitrile fibers specified herein.

The fibers used in making the overlay sheets of this invention may be of any suitable length. Generally, papers are made from fibers less than about 1 inch in length, while non-wovens are generally prepared from fibers at least about ½ inch in length. The thickness of the carrier sheet may vary from about 2–10 mils, and usually will be about 4–7 mils. Papers generally have a thickness of about 2–8 mils, while non-wovens are generally about 3–10 mils. The denier of the fiber is not critical and generally will be in the range of about 1–5. The basis weight of the carrier sheet will generally be about 10–30 pounds per 3,000 square feet, and preferably about 15–25. These carrier sheets are preferably color-free, however they may be tinted to produce unusual decorative effects, if desired.

The resinous component of the overlay sheets of this invention is derived from diallyl phthalate. The term "diallyl phthalate," as used throughout the specification and claims, is intended to include diallyl ortho-, iso- and tere-phthalates. Diallyl phthalates polymerize by addition polymerization through the allylic unsaturation, first forming a soluble, fusible partial polymer containing residual unsaturation, which on further polymerization is changed to an infusible, insoluble thermoset resin having excellent physical and chemical properties.

Diallyl phthalate partial polymers may be prepared by standard polymerization techniques, such as emulsion, solution or bulk polymerization, usually with a peroxide catalyst, as described by Pollack et al. in Patent No. 2,273,891. A preferred method for conducting this polymerization is described in a copending application of C. A. Heiberger, Serial No. 814,957, filed May 22, 1959.

As the diallyl phthalate polymerization reaction is allowed to proceed, the viscosity of the medium increases slowly at first, and then rapidly as the gel-point of the polymer is approached. The reaction is terminated before gelation has occurred, normally at about 25–35% conversion of monomer to partial polymer. The polymerization may be terminated by any standard procedure such as lowering the temperature, adding a solvent for the monomer which precipitates the partial polymer, or adding a polymerization inhibitor. The product of this polymerization is a solution containing partial polymer dissolved in monomer. The partial polymer is separated from monomer and residual solvent by known procedures, such as by stripping off volatile components, or dissolving the monomer in an appropriate solvent.

Diallyl phthalate partial polymers are linear or slightly branched, solid polymers containing residual unsaturation. The number average molecular weight of the partial polymer is generally less than about 25,000, and usually below about 10,000. These partial polymers are normally characterized by their precipitated polymer viscosity which is measured as a 25% solution of partial polymer in diallyl phthalate monomer at 25° C. The precipitated polymer viscosity is generally in the range of about 100–1,000 centipoises, and preferably 200–700 centipoises.

The overlay sheets of this invention are prepared by impregnating the fibrous carrier sheet with a solution containing (a) diallyl phthalate, about 85–100% of the diallyl phthalate being partial polymer and the remaining about 0–15% being monomer, (b) a catalytic amount of an organic peroxide, and (c) a volatile solvent, and drying the impregnated sheet, until the sheet is impregnated with a total of about 70–90%, by weight of the dried, impregnated sheet, of diallyl phthalate and has a residual volatile content of less than about 8%, measured as material volatile after heating the dried, impregnated sheet for 8 minutes at 320° F.

At least about 85% of the diallyl phthalate present in the impregnating solution should be present as partial polymer and the remaining about 0–15% as monomer. Preferably, the monomer is present in an amount of about 5–10% to facilitate escape of volatile solvent from the resin surface during drying, and to improve resin flow during lamination. If more than about 15% of the diallyl phthalate is monomer, the dried overlay sheet will generally be sticky and hard to handle.

The impregnating solution should also contain a catalytic amount of an organic peroxide to catalyze the final cure of the resin. There is no advantage in using more than about 5% by weight of peroxide, based on the diallyl phthalate, while at least about 0.5% is required for complete cure. Preferably, the peroxide is present in an amount of about 2–3%. Useful peroxides include diacyl peroxides such as benzoyl peroxide, p-chlorobenzoyl peroxide, 2,4-dichlorobenzoyl peroxide, lauroyl peroxide and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-dimethylhexane-2,5-di(peroxybenzoate), di-tert.-butyl diperphthalate, tert.-butyl peracetate, tert.-butyl peroxyisobutyrate and isopropyl percarbonate, as well as many other organic peroxides which have been described in the literature.

Preferably, the impregnating solution also contains about 2–5% by weight, based on the resinous component, of an internal release agent such as lauric acid, carnauba wax or beeswax. However, external release agents or other processing techniques may also be used instead of an internal release agent.

The impregnating solution is prepared by dissolving all of these components in a volatile solvent, which may be any of the conventional solvents useful for dissolving diallyl phthalate partial polymers. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, and many other solvents which can be evaporated out after impregnation of the carrier sheet. It may be preferred to use a mixture of solvents, in order to control the rate of evaporation during drying of the impregnated overlay sheet. Since the viscosity of a solution of given resin content, as well as the temperature and rate at which the solvent may be evaporated depend on the particular solvent, the choice of solvent will depend to some extent on the processing technique which is adopted for preparing the overlay sheet.

The impregnating solution should contain enough solvent to provide thorough impregnation of the carrier sheet, while at the same time having a resin content sufficient to provide the desired resin pickup during impregnation. The resin content of the impregnating solution may vary from about 25–70%, depending on the particular solvent system used. It is especially convenient to operate in the range of about 30–50% resin content for most solvents.

The fibrous carrier sheet should be impregnated with a total of about 70–90% by weight of impregnated sheet, of diallyl phthalate, and preferably about 75–85%. When the carrier sheet is impregnated with less than 70% of diallyl phthalate, there is insufficient resin forming material present and the resulting overlay contains resin-starved areas in which the fibers at the surface are not completely covered with resin. On the other hand, when the carrier sheet is impregnated with more than 90% of diallyl phthalate, there is insufficient reinforcing fiber present, and the overlay sheet is susceptible to checking and cracking.

The carrier sheet may be impregnated with resin using conventional equipment and techniques, whereby the sheet is passed through a tank containing the impregnating solution. The amount of resin pickup may be controlled by adjusting the rate at which the carrier sheet is passed through the solution, varying the solvent and the resin content of the impregnating solution, or using metering rolls, doctor blades, transfer rolls, or other standard saturating techniques. The impregnation is conveniently carried out at room temperature, followed by evaporation of the solvent at elevated temperature. The resin content of the carrier sheet is readily determined by weighing a sample of untreated carrier sheet and a sample of dried, impregnated carrier sheet and expressing the difference as the amount of resin on the carrier sheet.

After the desired resin content has been obtained on the carrier sheet, the sheet is dried to remove the volatile solvent. The drying conditions should be carefully controlled to remove nearly all of the volatiles present, while avoiding premature curing of the resin at this stage. The drying temperatures and time will, of course, depend on the amount of solvent to be removed, the solvent system used, and the speed at which the impregnated sheet passes through the drying oven. Drying should be carried out gradually, to prevent premature resin surface film formation and the subsequent formation of blisters which result in craters in the final product. Drying temperatures in the range of about 150–275° F. and drying times in the range of about 1–6 minutes will reduce acetone solvent retention to an acceptable level, whereas slightly different ranges may be used for other solvents. In general, no more than about 8% volatiles should remain in the impregnated overlay sheet after drying, with a preferred residual volatile content in the range of about 3–5%. Residual volatile content is measured as the weight loss observed by subjecting a sample of the dried, impregnated overlay sheet to a temperature of 320° F. for 8 minutes.

The dried, impregnated overlay sheets of this invention may be bent and rolled without cracking, and cut without flaking or chipping, and may be stored for prolonged periods without blocking or advancing in cure.

Decorative laminates may be prepared from the dried, impregnated overlay sheets of this invention by laminating the overlay sheet to a decorative surface. The decorative surface may be based upon any of the various decorative layers conventionally used in the decorative laminate art, the exact nature of which will depend upon the particular type of decorative laminate being prepared. For example, the decorative surface may be a resin-impregnated, printed decorative paper or a resin-impregnated fabric. Laminates based upon these decorative surfaces are prepared by laminating the impregnated overlay sheet and the impregnated decorative sheet to any of the conventional core materials which are reasonably rigid and have two parallel surfaces, one of which is smooth. Typical core materials include hardboard, particle board, plywood, lumber core, flake board, and cement-asbestos board. Other decorative surfaces may be provided by applying a ground coat to the surface of a core material and printing the desired design on the ground coat. When the core material itself provides the decorative surface, such as veneered plywood or finished lumber, the impregnated overlay sheets of this invention can be applied directly to the wood surface.

Lamination of the overlay sheet to the decorative surface may be accomplished using a standard platen press with one or more openings. Laminates can be cured with multiple openings either "face-to-face," using a caul finished on both sides, or "back-to-back" using two cauls, each finished on one side only. Either stainless steel or aluminum cauls of any desired finish, such as matte, satin, furniture finish or gloss, may be used. The cauls are generally treated with a release agent such as lauric acid or a silicone. The desired surface finish may also be obtained through the use of release or separating papers such as cellophane or papers coated or treated with release agents such as silicones, which papers are inserted between the caul plate and the resin-impregnated overlay sheet.

The impregnated overlay sheet should be laminated to the decorative surface at a temperature and pressure and for a time sufficient to convert the diallyl phthalate to a thermoset resin. The laminating pressure need only be high enough to consolidate the resin and to provide sufficient resin flow to bond the resin-impregnated sheets to the core material. The necessary pressure will depend upon such factors as the density and surface of the core material, the number of resin-impregnated sheets involved, and the resin content and flow characteristics of the impregnated sheets. Pressures approaching contact pressure, and as high as 450 p.s.i., have been used successfully. For most laminates a convenient pressure is in the range of about 100–300 p.s.i. If it is desired to laminate at pressures in excess of 350 p.s.i., it may be advisable to use overlay sheets in which the resin flow has been retarded by slightly advancing the cure of the resin during the drying operation, or in which the resin is free of monomer, since high laminating pressures are known to reduce the thickness of the resin film on the laminate.

The laminating temperature should be high enough to activate the catalyst, and to provide a reasonable rate of cure. For commercial operations, high curing temperatures are preferred since they provide shorter curing cycles, and thus increase productivity. In practice, the maximum laminating temperature is generally controlled by the heat stability of the core material. Curing temperatures up to 400° F. have been used for up to 5 minutes without charring such core materials as "Masonite," a lignocellulose hardboard. Lower temperatures, of course, require a longer curing time; temperatures as low as 200° F. have been used for prolonged periods. Temperatures in the range of about 275–375° F. are preferred, since within this range the rate of polymerization is reasonable, and no significant decomposition or degradation of the laminate is experienced. It is not necessary to cool the cured laminate in the press before removal.

The resin surfaces of decorative laminates produced in accordance with this invention are exceptionally clear, have no significant surface fiber-show and have excellent boiling water resistance. The following examples, illustrating the novel diallyl phthalate resin-impregnated overlay sheets of this invention and laminates produced therefrom, are presented without any invention that the invention be limited thereto. All parts and percentages are by weight unless otherwise indicated.

EXAMPLE 1

A typical diallyl phthalate partial polymer was prepared as follows: Eight thousand eight hundred sixty pounds of diallyl ortho-phthalate monomer, 622 lbs. of isopropanol (91% by vol.) and 75 lbs. of hydrogen peroxide (50.5% $H_2O_2$) were charged to a 1,500 gal. stainless steel reactor, thoroughly agitated and heated to a pot temperature of 104–108° C. at total reflux. After 10 hrs. the viscosity of the reaction mixture had increased to 27 cps. at 106° C., as measured by a Bendix Ultraviscoson computator. The batch was cooled, to obtain a reaction product having a viscosity of 425 cps. at 25° C. This polymeric reaction product, which consists of 27% partial polymer, 67% unreacted monomer and 6% isopropanol, was mixed intimately with 48,000 lbs. of isopropanol (91% by vol.), and the partial polymer precipitated at 0° C. The solid polymer was separated by filtration and dried, to yield a 27.6% conversion of monomer to polymer. The properties of the partial polymer obtained by this process were:

PPV, cps. at 25° C. _____ 354
Softening range, ° C. _____ 80–105
Iiodine No. _____ 55
Sp. gr. at 25° C. (ASTM D792–50) _____ 1.267

The PPV given above is the precipitated polymer viscosity of a 25% solution of polymer in monomer at 25° C.

A diallyl phthalate resin-impregnated overlay sheet was prepared as follows: An unpigmented, non-woven fabric, 7 mils thick, with a basis weight of 18 lbs. per 3,000 sq. ft. and containing 100% polymeric fibers in which the polymer forming units were 95% acrylonitrile and 5% vinylpyridine, 1.25 in. long and 3 denier, was impregnated by passing at the rate of 20 ft. per min. through a solution of the following composition:

|  | Parts |
|---|---|
| Diallyl ortho-phthalate partial polymer | 98 |
| Diallyl ortho-phthalate monomer | 2 |
| tert.-butyl perbenzoate | 3 |
| Lauric acid | 2 |
| Acetone | 250 |

The impregnated sheet was dried in a 2-zone oven at 250° F. for 1.5 min. and at 230° F. for 1.5 min. to produce a tack-free overlay sheet having a resin content of 83% and a volatile content of 4.5%. Resin content was measured by weighing samples of untreated and dried, impregnated carrier sheet and expressing the difference as the amount of resin on the carrier sheet. Percent volatiles was measured as the percent weight loss after heating a sample of the overlay sheet for 8 min. at 320° F.

A decorative laminate was prepared from the dry, resin-impregnated overlay sheet as follows: The above overlay sheet was laminated to a ⅛ in. tempered Masonite lignocellulose hardboard which had been opacified by coating with a ground coat and printed with compatible ink. The hardboard had been predried for 12 min. at 375° F. to remove surface moisture. The layup consisted of a slip caul followed by a sheet of glassine separator paper, a sheet of phenolic-impregnated kraft paper as a balancing sheet, the printed, ground coated hardboard, the diallyl phthalate resin-impregnated overlay sheet, and a polished stainless steel caul plate. The layup was cured in a laminating press by heating for 12 min. at 330° F. under a pressure of 200 p.s.i.

For comparison, an impregnated rayon overlay sheet, not within the scope of this invention, was prepared as follows: An unpigmented non-woven fabric, 7 mils thick, with a basis weight of 18 lbs. per 3,000 sq. ft., containing 100% rayon fibers, 1.25 in. long and 2 denier, was impregnated and dried in the manner set forth above. The impregnated overlay sheet had a resin content of 83% and a volatile content of 4.5%. This overlay sheet was laminated to a ⅛ in. tempered Masonite lignocellulose hardboard opacified by coating with a ground coat and printed with compatible ink, in the same manner as before.

The above decorative laminates were allowed to cool for 24 hrs. and then observed to determine relative clarity and surface fiber-show, and tested for boiling water resistance in accordance with NEMA Standard LP 2–2.02. The following data were obtained for the laminates of this example.

Table 1

| Carrier Sheet Fibers | Clarity | Surface Fiber-Show | Boiling Water Resistance |
| --- | --- | --- | --- |
| Polyacrylonitrile | 1 | 1 | 1 |
| Rayon | 2 | 3 | 3 |

In the above table, a rating of 1 is excellent, a rating of 2 is good, and a rating of 3 is fair.

EXAMPLE 2

A diallyl phthalate resin-impregnated overlay sheet was prepared as follows: An unpigmented paper, 5 mils thick, with a basis weight of 20 lbs. per 3,000 sq. ft. and containing 80% polymeric fibers in which the polymer forming units were 95% acrylonitrile and 5% vinyl pyridine, 0.25 in. long and 2 denier, and 20% alpha-cellulose fibers was impregnated by passing at the rate of 7 ft. per min. through a solution of the following composition:

| | Parts |
| --- | --- |
| Diallyl ortho-phthalate partial polymer | 93 |
| Diallyl orho-phthalate monomer | 7 |
| tert.-butyl perbenzoate | 3 |
| Lauric acid | 3 |
| Methyl ethyl ketone | 200 |

The impregnated sheet was dried in a 2-zone oven at 220° F. for 2.5 min. and at 260° F. for 2.5 min. to produce a tack-free overlay sheet having a resin content of 78% and a volatile content of 4.0%.

A decorative laminate was prepared from this dry, resin-impregnated overlay sheet as follows: The above overlay sheet was laminated to a 0.75 in. walnut veneered Timblend particle board which had been predried for 10 min. at 320° F. The layup consisted of a slip caul followed by a sheet of glassine separator paper, a sheet of phenolic-impregnated kraft paper as a balancing sheet, the walnut veneered particle board, the diallyl phthalate resin-impregnated overlay sheet, and a polished aluminum caul plate. The layup was cured in a laminating press by heating for 18 min. at 320° F., under a pressure of 100 p.s.i.

For comparison, an impregnated cellulose overlay sheet, not within the scope of this invention, was prepared as follows: An unpigmented 100% alpha-cellulose paper, 3.5 mils thick, with a basis weight of 20 lbs. per 3,000 sq. ft. was impregnated and dried in the manner set forth above. The impregnated overlay sheet had a resin content of 78% and a volatile content of 4.0%. A laminate was prepared by laminating this overlay sheet to a 0.75 in. walnut veneered Timblend particle board in the same manner as before.

The above decorative laminates were allowed to cool for 24 hrs. and then observed to determine relative clarity, surface fiber-show, and boiling water resistance. The following data were obtained from the laminate of this example.

Table II

| Carrier Sheet Fibers | Clarity | Surface Fiber-Show | Boiling Water Resistance |
| --- | --- | --- | --- |
| 80% polyacrylonitrile, 20% alpha-cellulose | 1 | 2 | 1 |
| 100% alpha-cellulose | 2 | 4 | 4 |

In the above table, a rating of 1 is excellent, a rating of 2 is good, and a rating of 4 is poor.

EXAMPLE 3

A diallyl phthalate resin-impregnated overlay sheet was prepared as follows: An unpigmented, calendered overlay paper, 3 mils thick, with a basis weight of 18 lbs. per 3,000 sq. ft. and containing 100% polymeric fibers in which the polymer forming units were 88% acrylonitrile and 12% methyl methacrylate, ¼ in. long and 3 denier, was impregnated by passing at a rate of 8 ft. per min. through a solution of the following composition:

| | Parts |
| --- | --- |
| Diallyl ortho-phthalate partial polymer | 93 |
| Diallyl ortho-phthalate monomer | 7 |
| 2,5-dimethylhexane-2,5-di(peroxybenzoate) | 2 |
| Lauric acid | 3 |
| Acetone | 200 |

The impregnated sheet was dried for 5 min. at 230° F. to produce a tack-free overlay sheet having a resin content of 74% and a volatile content of 5.0%.

A decorative laminate was prepared from this dry, resin-impregnated overlay sheet as follows: The above overlay sheet was laminated to a 0.75 in. walnut-veneered Timblend particle board which has been predried for 10 min. at 320° F. The layup consisted of a slip caul followed by a glassine separator paper, a phenolic-impregnated kraft paper, the walnut veneered particle board, the diallyl phthalate resin-impregnated overlay sheet, and a polished aluminum caul plate. The layup was cured in a laminating press by heating for 18 min. at 320° F. under a pressure of 135 p.s.i. The resulting laminate had excellent clarity, surface fiber-show, and boiling water resistance properties.

EXAMPLE 4

A diallyl phthalate resin-impregnated overlay sheet was prepared as follows: An unpigmented, non-woven fabric, 6 mils thick, with a basis weight of 20 lbs. per 3,000 sq. ft. and containing 100% polymeric fibers in which the polymer forming units were 85% acrylonitrile and 15% vinyl acetate, 1.25 in. long and 1.5 denier, was impregnated by passing at a rate of 6 ft. per min. through a solution of the following composition:

| | Parts |
| --- | --- |
| Diallyl ortho-phthalate partial polymer | 89 |
| Diallyl ortho-phthalate monomer | 11 |
| tert.-butyl perbenzoate | 4 |
| Lauric acid | 3 |
| Acetone | 180 |

The impregnated sheet was dried for 5 min. at 230° F. to produce a tack-free overlay sheet having a resin content of 80% and a volatile content of 5.2%.

A decorative laminate was prepared from this dry, resin impregnated overlay sheet as follows: The above overlay sheet was laminated to a resin-impregnated, printed decorative paper, 5 mils thick, over a 0.75 in. lignocellulose hardboard. The decorative paper was impregnated with 65% diallyl phthalate resin and had a volatile content of 4.5%. The layup consisted of a slip caul followed by a glassine separator paper, a phenolic-impregnated kraft paper, the hardboard, the diallyl phthlate resin-impregnated decorative paper, the diallyl phthalate resin-impregnated overlay sheet, and a polished aluminum caul plate. The layup was cured in a laminating press by heating for 15 min. at 310° F., under a pressure of 150 p.s.i. The resulting laminate had excellent clarity, surface fiber-show, and boiling water resistance properties.

EXAMPLE 5

A resin-impregnated overlay sheet containing diallyl isophthalate was prepared as follows: An unpigmented, non-woven fabric, 8 mils thick, with a basis weight of 20 lbs. per 3,000 sq. ft. and containing 100% polymeric fibers in which the polymer forming units were 95% acrylonitrile and 5% vinyl-pyridine, 1.25 in. long and 3 denier, was impregnated by passing at the rate of 10 ft. per min. through a solution of the following composition:

| | Parts |
|---|---|
| Diallyl ortho-phthalate partial polymer | 93 |
| Diallyl isophthalate monomer | 7 |
| tert.-butyl perbenzoate | 3 |
| Lauric acid | 3 |
| Acetone | 200 |

The impregnated sheet was dried at 240° F. for 5 min. to produce a tack-free impregnated overlay sheet having a resin content of 86% and a volatile content of 3.5%.

A decorative laminate was prepared from the dry, resin-impregnated overlay sheet as follows: The above overlay sheet was laminated to a 1/8 in. tempered lignocellulose hardboard which had been opacified by coating with a ground coat and printed with compatible ink. The hardboard was predried for 12 min. at 320° F. to remove surface moisture. The layup consisted of a slip caul followed by a sheet of glassine separator paper, a sheet of phenolic-impregnated kraft paper as a balancing sheet, the printed, ground coated hardboard, the diallyl phthalate resin-impregnated overlay sheet, and a polished aluminum caul plate. The layup was cured in a laminating press by heating for 12 min. at 330° F. under a pressure of 200 p.s.i. The resulting laminate had excellent clarity, surface fiber-show, and boiling water resistance properties.

As will be apparent to those skilled in the art, numerous modifications and variations of the embodiments illustrated above may be made without departing from the spirit of the invention or the scope of the following claims.

We claim:

1. A dry, flexible diallylic phthalate resin-impregnated overlay sheet suitable for use in the preparation of decorative laminates having improved resin surface properties, which comprises an unpigmented, fibrous carrier sheet having a basis weight not in excess of 30 pounds per 3,000 square feet and containing a major portion of polymeric fibers wherein at least 80% by weight of the polymer forming units are acrylonitrile, impregnated with 70–90% of diallyl phthalate, by weight of the impregnated sheet, 85–100% of said diallyl phthlate being a partial polymer and the remaining 0–15% being monomer, and a catalytic amount of an organic peroxide, said overlay sheet having a residual volatile content of less than 8% by weight, measured as material volatile after heating said overlay sheet for 8 min. at 320 F.

2. A dry, flexible diallylic phthalate resin-impregnated overlay sheet suitable for use in the preparation of decorative laminates having improved properties, which comprises an unpigmented, fibrous carrier sheet having a basis weight of 10–30 pounds per 3,000 square feet and containing a major portion of polymeric fibers wherein at least 90% by weight of the polymer forming units are acrylonitrile, impregnated with 75–85% of diallyl phthalate, by weight of the impregnated sheet, 90–95% of said diallyl phthalate being a partial polymer and the remaining 5–10% being monomer, 2–5%, by weight of said diallyl phthalate, of lauric acid, and 2–3%, by weight of said diallyl phthalate, of an organic peroxide, said overlay sheet having a residual volatile content of 3–5% by weight, measured as material volatile after heating said overlay sheet for 8 min. at 320° F.

3. A diallyl phthalate resin decorative laminate having improved resin surface properties which comprises an impregnated overlay sheet comprising an unpigmented, fibrous carrier sheet having a basis weight not in excess of 30 pounds per 3,000 square feet and containing a major portion of polymeric fibers wherein at least 80% by weight of the polymer forming units are acrylonitrile, impregnated with 70–90% of thermoset diallyl phthalate resin, laminated to a decorative surface.

4. A diallyl phthalate resin decorative laminate having improved resin surface properties which comprises an impregnated overlay sheet comprising an unpigmented, fibrous carrier sheet having a basis weight of 10–30 pounds per 3,000 square feet and containing a major portion of polymeric fibers wherein at least 90% by weight of the polymer forming units are acrylonitrile, impregnated with 75–85% of thermoset diallyl phthalate resin, laminated to a decorative surface.

References Cited by the Examiner

UNITED STATES PATENTS

| | | | |
|---|---|---|---|
| 2,595,852 | 5/52 | Hopper et al. | |
| 2,922,732 | 1/60 | Hopkins et al. | 161—409 X |
| 2,990,388 | 6/61 | Johnston et al. | |
| 3,013,936 | 12/61 | Iyengar. | |
| 3,047,456 | 7/62 | Ucci et al. | 162—157 |
| 3,049,458 | 8/62 | Willard. | |

ALEXANDER WYMAN, *Primary Examiner.*

EARL M. BERGERT, MORRIS SUSSMAN,
*Examiners.*